(12) United States Patent
Moroga et al.

(10) Patent No.: US 10,856,179 B2
(45) Date of Patent: Dec. 1, 2020

(54) USER EQUIPMENT

(71) Applicant: NTT DOCOMO, INC., Tokyo (JP)

(72) Inventors: Hideyuki Moroga, Tokyo (JP); Kazuki Takeda, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/344,469

(22) PCT Filed: Aug. 23, 2017

(86) PCT No.: PCT/JP2017/030128
§ 371 (c)(1),
(2) Date: Apr. 24, 2019

(87) PCT Pub. No.: WO2018/083863
PCT Pub. Date: May 11, 2018

(65) Prior Publication Data
US 2019/0335359 A1    Oct. 31, 2019

(30) Foreign Application Priority Data
Nov. 2, 2016  (JP) .................................. 2016-215704

(51) Int. Cl.
*H04L 5/00*      (2006.01)
*H04L 27/26*     (2006.01)
(Continued)

(52) U.S. Cl.
CPC ........... *H04W 28/06* (2013.01); *H04L 5/0007* (2013.01); *H04L 5/0048* (2013.01);
(Continued)

(58) Field of Classification Search
CPC .... H04L 5/0048; H04L 1/1861; H04L 5/0073
See application file for complete search history.

(56) References Cited

U.S. PATENT DOCUMENTS

2012/0051317 A1*  3/2012  Han .................... H04B 7/0417
                                                              370/329
2014/0050205 A1   2/2014  Ahn et al.
(Continued)

FOREIGN PATENT DOCUMENTS

JP   2014-093628 A    5/2014
WO   2014/027573 A1   2/2014

OTHER PUBLICATIONS

International Search Report issued in PCT/JP2017/030128 dated Oct. 31, 2017 (5 pages).
(Continued)

*Primary Examiner* — Raj Jain
(74) *Attorney, Agent, or Firm* — Osha Bergman Watanabe & Burton LLP

(57) ABSTRACT

Provided is an uplink signal configuration for a wireless communication system capable of performing uplink transmission by a plurality of communication schemes.
A user equipment capable of performing uplink transmission by a plurality of communication schemes, includes: a transmission/reception unit configured to transmit and receive a radio signal to and from a base station; and a signal processing unit configured to process the radio signal, wherein the signal processing unit generates an uplink control signal and an uplink data signal according to a first uplink signal configuration mapping the uplink control signal to an uplink control channel and mapping the uplink data signal to an uplink shared channel, and wherein the transmission/reception unit simultaneously transmits the uplink control signal and the uplink data signal generated according the first uplink signal configuration according to a selected communication scheme.

15 Claims, 5 Drawing Sheets

(51) Int. Cl.
*H04W 52/30* (2009.01)
*H04W 28/06* (2009.01)
*H04W 72/04* (2009.01)

(52) U.S. Cl.
CPC ......... *H04L 27/2628* (2013.01); *H04W 52/30* (2013.01); *H04W 72/0413* (2013.01)

(56) References Cited

U.S. PATENT DOCUMENTS

| | | | |
|---|---|---|---|
| 2014/0177531 A1* | 6/2014 | Imamura ............... | H04L 5/0035 370/328 |
| 2015/0223177 A1 | 8/2015 | Hayashi et al. | |
| 2016/0135149 A1* | 5/2016 | Aiba ................... | H04W 52/146 370/329 |
| 2019/0058515 A1* | 2/2019 | Harada ................ | H04W 24/10 |
| 2019/0335359 A1* | 10/2019 | Moroga ............... | H04W 52/16 |

OTHER PUBLICATIONS

Written Opinion of the International Searching Authority issued in PCT/JP2017/030128 dated Oct. 31, 2017 (4 pages).

3GPP TS 36.211 V14.2.0; "3rd Generation Partnership Project; Technical Specification Group Radio Access Network; Evolved Universal Terrestrial Radio Access (E-UTRA); Physical channels and modulation (Release 14)"; Mar. 2017 (194 pages).

3GPP TS 36.213 V14.2.0; "3rd Generation Partnership Project; Technical Specification Group Radio Access Network; Evolved Universal Terrestrial Radio Access (E-UTRA); Physical layer procedures (Release 14)"; Mar. 2017 (454 pages).

\* cited by examiner

USER EQUIPMENT

TECHNICAL FIELD

The present invention relates to a wireless communication system.

BACKGROUND ART

In third generation partnership project (3GPP), long term evolution (LTE) and next generation communication standards (5G and NR) as an LTE-Advanced have been discussed. In the NR system, in order to simultaneously achieve both super high speed/large capacity and coverage, it has been considered to combine orthogonal frequency division multiplexing (OFDM) and discrete fourier transform (DFT)-s-OFDM in uplink (UL) transmission.

In this case, a user equipment (UE) in the vicinity of the center of a cell typically can be controlled to use the OFDM to which a higher rank with a lower transmission power can be applied in order to achieve high throughput. On the other hand, a user equipment in the vicinity of the edge of a cell can only apply a rank lower than the OFDM. However, the user equipment is controlled by using the DFT-s-OFDM with a small peak-to-average power ratio (PAPR) and increasing a transmission power so as to realize a wide coverage.

SUMMARY OF THE INVENTION

Problem to be Solved by the Invention

As described above, in the NR system, the uplink transmission by different communication schemes (waveforms or the like) is assumed. However, in the uplink transmission by different communication schemes, specific signal configurations for simultaneously transmitting an uplink control signal and an uplink data signal has not been studied.

In view of the above problems, the present invention is to provide an uplink signal configuration in a wireless communication system capable of simultaneously transmitting the uplink control signal and the uplink data signal in a plurality of communication schemes.

Means for Solving Problem

In order to solve the above problem, according to an aspect of the present invention, there is provided a user equipment capable of simultaneously transmitting an uplink control signal and an uplink data signal in a plurality of communication schemes, including: a transmission/reception unit configured to transmit and receive a radio signal to and from a base station; and a signal processing unit configured to process the radio signal, wherein the signal processing unit generates the uplink control signal and the uplink data signal according to a first uplink signal configuration mapping the uplink control signal to an uplink control channel and mapping the uplink data signal to an uplink shared channel, and wherein the transmission/reception unit simultaneously transmits the uplink control signal and the uplink data signal generated by the first uplink signal configuration according to a selected communication scheme.

Effect of the Invention

It is possible to provide an uplink signal configuration for a wireless communication system capable of performing uplink transmission by a plurality of communication schemes.

MODE(S) FOR CARRYING OUT THE INVENTION

Hereinafter, embodiments of the present invention will be described with reference to the drawings.

In the following embodiments, a wireless communication system capable of performing uplink transmission by a plurality of communication schemes is disclosed. To summarize the embodiments described below, a user equipment generates an uplink control signal and an uplink control signal according to various uplink signal configurations mapping the uplink control signal and the uplink data signal to an uplink control channel and/or an uplink shared channel and simultaneously transmits the uplink control signal and the uplink data signal according to a selected communication scheme such as OFDM or DFT-s-OFDM.

Figure 1:
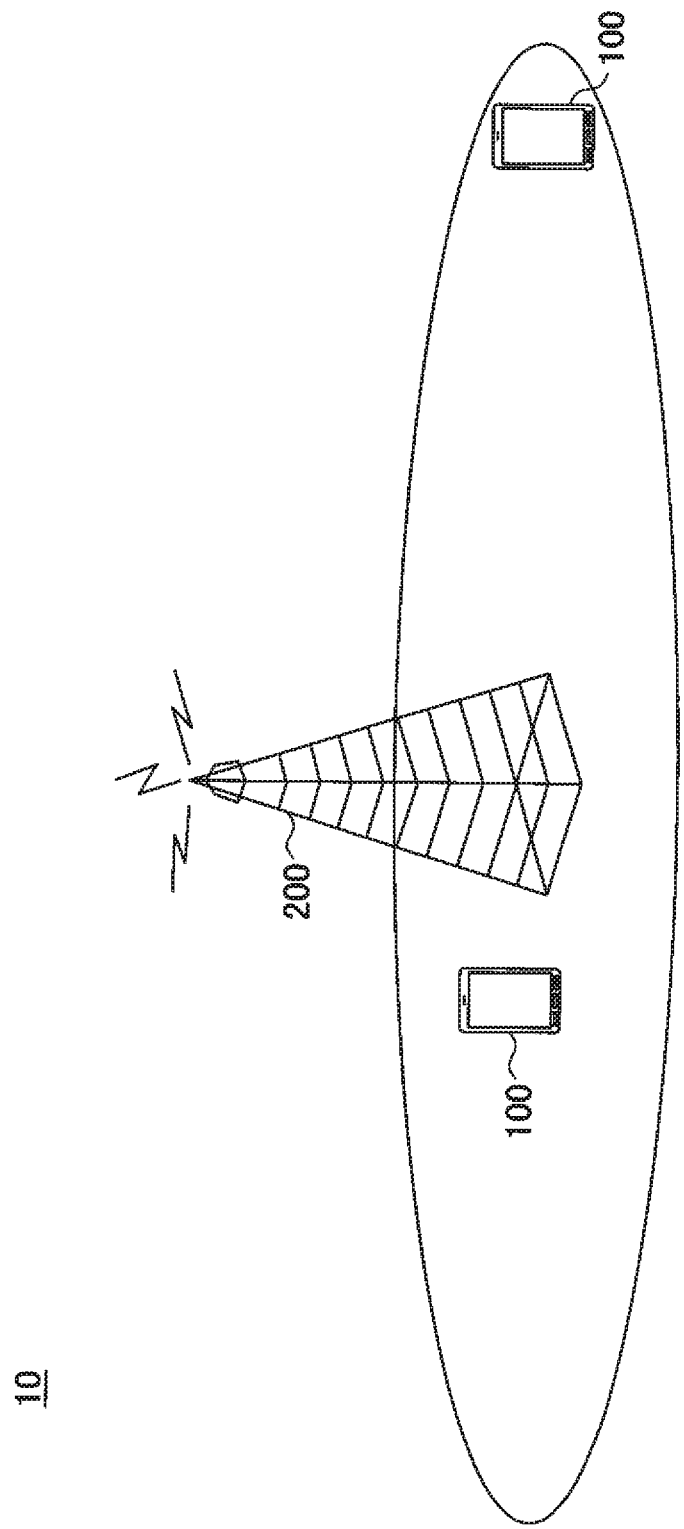
FIG. 1 is a schematic diagram illustrating a wireless communication system according to an embodiment of the present invention.

First, a wireless communication system according to an embodiment of the present invention will be described with reference to FIG. 1. FIG. 1 is a schematic diagram illustrating the wireless communication system according to the embodiment of the present invention.

As illustrated in FIG. 1, the wireless communication system 10 is configured to include a user equipment 100 and a base station 200. In the following embodiment, the wireless communication system 10 is a wireless communication system (for example, a 5G or NR system) in accordance with the 3GPP Rel-14 or later standards. However, the present invention is not limited thereto, and any other wireless communication system capable of performing uplink transmission by different communication schemes (waveforms) such as OFDM and DFT-s-OFDM may be used.

The user equipment 100 is any appropriate information processing device having a wireless communication function of a smartphone, a mobile phone, a tablet, a wearable terminal, a communication module for machine-to-machine (M2M), or the like and wirelessly connects to the base station 200 to utilize various communication services provided by the wireless communication system 10.

The base station 200 provides one or more cells and wirelessly communicates with the user equipment 100. Although only one base station 200 is illustrated in the illustrated embodiment, in general, a number of the base stations 200 are arranged to cover a coverage area of the wireless communication system 10.

Figure 2:
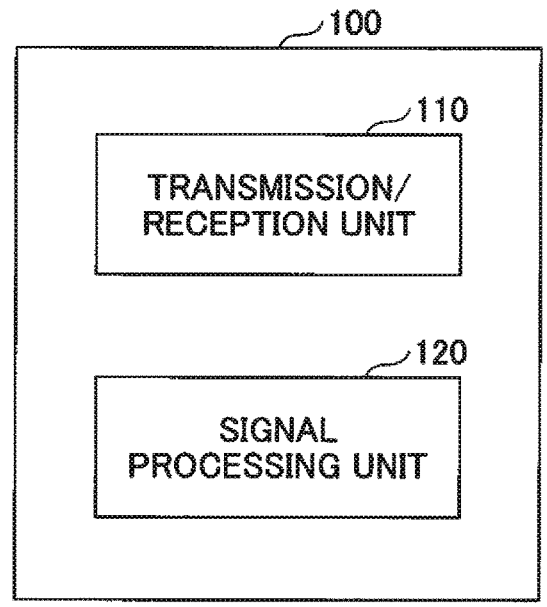
FIG. 2 is a block diagram illustrating a functional configuration of a user equipment according to an embodiment of the present invention.

Next, the user equipment according to the embodiment of the present invention will be described with reference to FIG. 2. The user equipment according to this embodiment can perform uplink transmission by a plurality of communication schemes. For example, the user equipment supports two communication schemes (waveforms) such as a multi-carrier scheme such as OFDM and a single carrier scheme such as DFT-s-OFDM and performs uplink transmission while switching these communication schemes. FIG. 2 is a block diagram illustrating a functional configuration of the user equipment according to the embodiment of the present invention.

As illustrated in FIG. 2, the user equipment 100 is configured to include a transmission/reception unit 110 and a signal processing unit 120.

The transmission/reception unit 110 transmits and receives radio signals to and from the base station 200. Specifically, the transmission/reception unit 110 transmits and receives various radio signals such as uplink/downlink control signals and uplink/downlink data signals to/from the base station 200. In the embodiment, the transmission/reception unit 110 transmits an uplink signal while switching between different communication schemes (waveforms) such as OFDM and DFT-s-OFDM.

In the NR system, as the uplink waveform configurations, several types of configurations such as (1) both the OFDM and the DFT-s-OFDM are applicable and dynamically switched (at a predetermined time interval such as a subframe, a slot, or a mini-slot); (2) both the OFDM and the DFT-s-OFDM are applicable and semi-statically switched (at a fixed time interval, by a predetermined trigger, or the like); and (3) only the OFDM is applicable are considered. Which type of waveform configuration to apply is notified, for example, from the base station 200 to the user equipment 100. The transmission/reception unit 110 performs uplink transmission according to any one of the OFDM and the DFT-s-OFDM communication schemes according to the waveform configuration notified from the base station 200.

The signal processing unit 120 processes a radio signal. Specifically, the signal processing unit 120 generates an uplink signal for transmission to the base station 200 according to the selected uplink signal configuration, provides the generated uplink signal to the transmission/reception unit 110, and processes a downlink signal received by the transmission/reception unit 110. Specific processing of the signal processing unit 120 will be described in detail later.

Next, the uplink signal configuration according to a first embodiment of the present invention will be described with reference to FIG. 3. In the first embodiment, the signal processing unit 120 maps the uplink control signal to the uplink control channel and generates the uplink control signal and the uplink data signal according to the uplink signal configuration mapping the uplink data signal to the uplink shared channel, and the transmission/reception unit 110 simultaneously transmits the generated uplink control signal and the generated uplink data signal according to the selected communication scheme.

Figure 3:
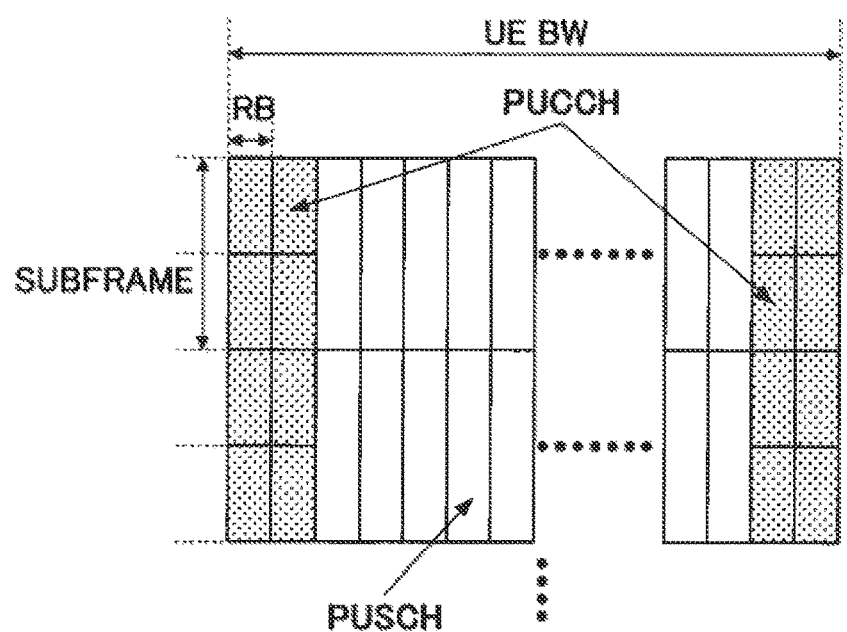
FIG. 3 is a schematic diagram illustrating an uplink signal configuration according to a first embodiment of the present invention.

As illustrated in FIG. 3, in the case of simultaneously transmitting the uplink control signal such as a UCI (uplink control information) signal and the uplink data signal, the signal processing unit 120 maps the uplink control signal and the uplink data signal to an uplink control channel (physical uplink control channel (PUSCH)) and an uplink shared channel (physical uplink shared channel (PUSCH) or the like), respectively, and the transmission/reception unit 110 simultaneously transmits the uplink control signal and the uplink data signal to the base station 200 according to the applied communication scheme. Herein, the simultaneous transmission denotes transmission at the same predetermined time interval such as the same subframe, slot, or mini-slot obtained by dividing one slot into a plurality of mini-slots. In the illustrated specific example, the uplink control signal is transmitted at both ends of a transmission bandwidth of the user equipment 100. However, the present invention is not limited thereto, and the uplink control signal may be transmitted at other frequency positions.

According to this embodiment, without substantially changing a signal configuration such as LTE in the related art, it is possible to simultaneously transmit the uplink control signal and the uplink data signal in the uplink transmission to which a plurality of communication schemes are applied.

Next, an uplink signal configuration according to a second embodiment of the present invention will be described with reference to FIG. 4. In the second embodiment, the signal processing unit 120 generates the uplink control signal and the uplink data signal according to the uplink signal configuration mapping the uplink control signal and the uplink data signal to the uplink shared channel by puncturing a portion of radio resources of the uplink shared channel, and the transmission/reception unit 110 simultaneously transmits the generated uplink control signal and the generated uplink data signal according to the selected communication scheme.

Figure 4:
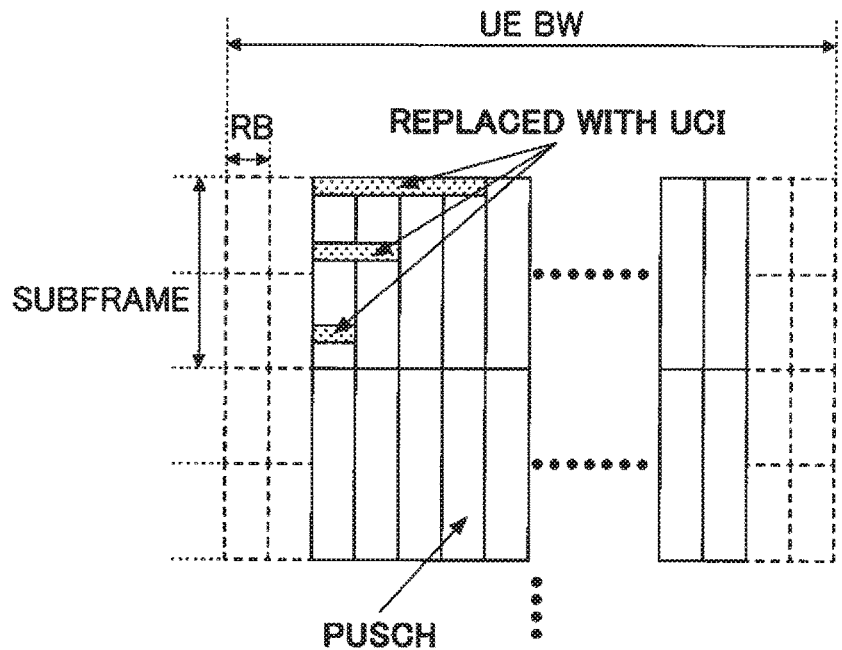
FIG. 4 is a schematic diagram illustrating an uplink signal configuration according to a second embodiment of the present invention.

As illustrated in FIG. 4, in the case of simultaneously transmitting the uplink control signal such as UCI and the uplink data signal, the signal processing unit 120 maps the uplink control signal and the uplink data signal to the uplink shared channel (PUSCH or the like) by puncturing a portion of the radio resources of the uplink shared channel and by mapping the uplink control signal to the radio resources, and the transmission/reception unit 110 simultaneously transmits the uplink control signal and the uplink data signal to the base station 200 according to the applied communication scheme. In the illustrated specific example, the uplink control signal is transmitted at one end of the transmission bandwidth of the user equipment 100. However, the present invention is not limited thereto, and the uplink control signal may be transmitted at other frequency positions.

According to this embodiment, in comparison with the first embodiment where additional radio resources are used for transmitting the uplink control signal, it is possible to avoid an increase in peak-to-average power ratio (PAPR).

Next, an uplink signal configuration according to a third embodiment of the present invention will be described with reference to FIG. 5. In the third embodiment, the signal processing unit 120 generates the uplink control signal and the uplink data signal according to the uplink signal configuration mapping the uplink control signal and the uplink data signal to the uplink shared channel by puncturing a portion of the radio resources of the uplink shared channel and by performing rate-matching on the uplink data signal, and the transmission/reception unit 110 simultaneously transmits the generated uplink control signal and the generated uplink data signal according to the selected communication scheme.

Figure 5:
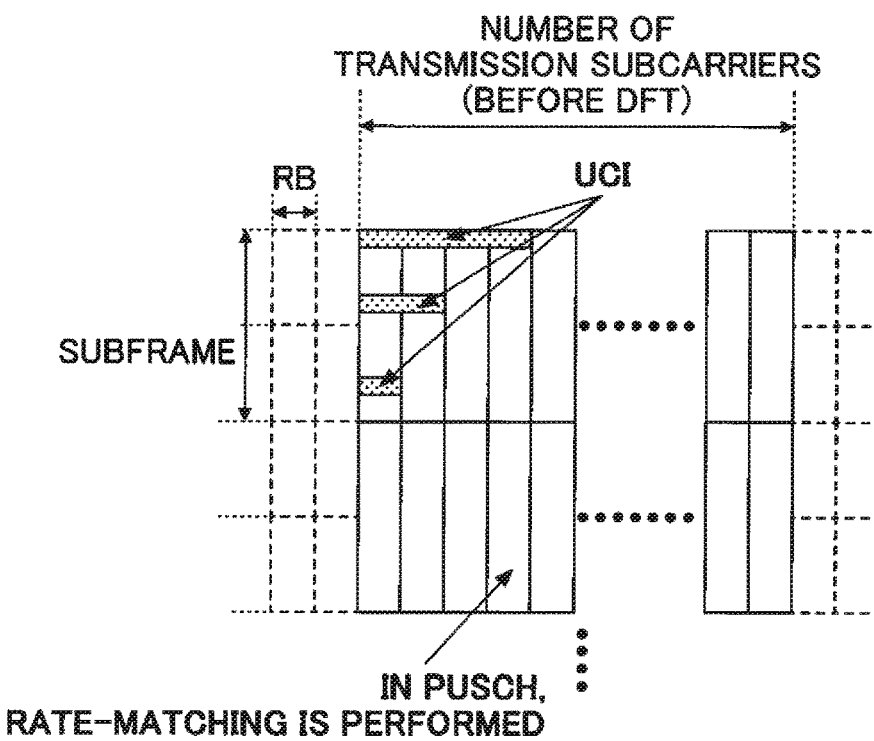
FIG. 5 is a schematic diagram illustrating an uplink signal configuration according to a third embodiment of the present invention.

As illustrated in FIG. 5, in the case of simultaneously transmitting the uplink control signal such as UCI and the uplink data signal, the signal processing unit 120 maps the uplink control signal and the uplink data signal to the uplink shared channel by puncturing a portion of the radio resources of the uplink shared channel (PUSCH or the like) and by further performing rate-matching on the uplink data signal, and the transmission/reception unit 110 simultaneously transmits the uplink control signal and the uplink data signal to the base station 200 according to the applied communication scheme. In order to avoid a reduction in the error rate at the time of decoding the uplink data signal due to the puncturing of the radio resources in the uplink shared channel, the encode rate of the uplink data signal is adjusted in correspondence with the remaining radio resources by performing the rate-matching on the uplink data signal. In the illustrated specific example, the uplink control signal is transmitted at one end of the transmission bandwidth of the user equipment 100. However, the present invention is not limited thereto, and the uplink control signal may be transmitted at other frequency positions.

According to this embodiment, in comparison with the second embodiment where the radio resources for transmitting the uplink data signal are punctured, it is possible to avoid an increase in the peak-to-average power ratio (PAPR) while reducing deterioration in characteristics of the uplink data signal.

Next, an uplink signal configuration according to a fourth embodiment of the present invention will be described with reference to FIG. 6. In the fourth embodiment, the signal processing unit 120 generates the uplink control signal and the uplink data signal according to the uplink signal configuration mapping the uplink control signal to the uplink control channels of some layers and mapping the uplink data signal to the uplink control channels and the uplink shared channels of other layers, and the transmission/reception unit 110 simultaneously transmits the generated uplink control signal and the generated uplink data signal according to the selected communication scheme.

Figure 6:
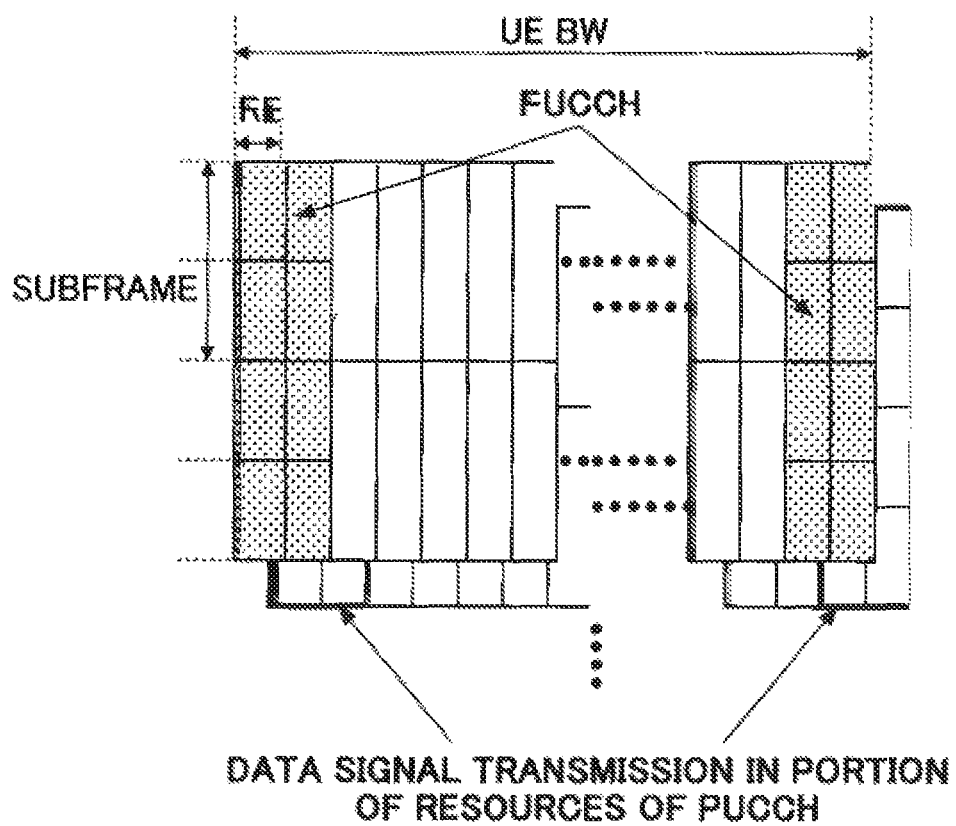
FIG. 6 is a schematic diagram illustrating an uplink signal configuration according to a fourth embodiment of the present invention.

As illustrated in FIG. 6, in the case of simultaneously transmitting uplink control signals such as UCI signals and uplink data signals, when uplink control channels (PUCCHs or the like) are allocated to a plurality of layers, the signal processing unit 120 maps the uplink control signals to the uplink control channels of some layers and maps the uplink data signals to the uplink control channels and the uplink shared channels (PUSCHs or the like) of other layers, respectively, and the transmission/reception unit 110 simultaneously transmits the uplink control signals and the uplink data signals to the base station 200 according to the applied communication scheme. For example, in order to transmit the uplink data signals in the radio resources in the uplink control channels of some layers, the encode rate of the uplink data signals is adjusted in correspondence with the increased radio resources by performing the rate-matching on the uplink data signals. In the illustrated specific example, the uplink control signal is transmitted at both ends of the transmission bandwidth of the user equipment 100. However, the present invention is not limited thereto, and the uplink control signal may be transmitted at other frequency positions.

In addition, a combination of the first to fourth embodiments may be used in the case transmission is performed in multiple layers. For example, while one layer maps the uplink control signal to the uplink control channel, the other layer may map the uplink control signal to the uplink shared channel.

According to this embodiment, in the uplink transmission to which a plurality of communication schemes are applied, it is possible to simultaneously transmit the uplink control signal and the uplink data signal while improving the efficiency of the radio resources.

In one embodiment, the user equipment 100 may selectively use the above-described uplink signal configuration according to a transmission timing of the uplink control signal and the uplink data signal. Namely, the user equipment 100 may selectively use the above-described uplink signal configuration according to the presence or absence of the uplink data signal to be transmitted at the transmission timing of the uplink control signal.

Specifically, in a case where the DFT-s-OFDM is selected as the communication scheme, when there is no uplink data signal to be transmitted at the transmission timing of the uplink control signal, the signal processing unit 120 may transmit the uplink control signal through the uplink control channel (PUCCH or the like), and when there is an uplink data signal to be transmitted, the signal processing unit 120 may simultaneously transmit the uplink control signal and the uplink data signal through the uplink shared channel (PUSCH or the like) according to the above-described second or third embodiment. In general, in the DFT-s-OFDM, it is necessary to allocate consecutive radio resources. Therefore, in a case where the DFT-s-OFDM is selected as the communication scheme, the signal processing unit 120 may generate the uplink control signal and the uplink data signal according to the uplink signal configuration according to the second or third embodiment capable of avoiding an increase in PAPR, and the transmission/reception unit 110 may simultaneously transmit the generated uplink control signal and the generated uplink data signal to the base station 200.

On the other hand, in a case where the OFDM is selected as the communication scheme, when there is no uplink data signal to be transmitted at the transmission timing of the uplink control signal, the signal processing unit 120 may transmit the uplink control signal through the uplink control channel (PUCCH or the like), and when there is an uplink data signal to be transmitted, the signal processing unit 120 may simultaneously transmit the uplink control signal and the uplink data signal through the uplink shared channel (PUSCH or the like) according to the above-described first or fourth embodiment. In general, in the OFDM, it is not necessary to allocate consecutive radio resources, and discrete radio resources may be allocated. Therefore, in a case where the OFDM is selected as the communication scheme, the signal processing unit 120 may generate the uplink control signal and the uplink data signal according to the uplink signal configuration according to the first or fourth embodiment, and the transmission/reception unit 110 may simultaneously transmit the generated uplink control signal and the generated uplink data signal to the base station 200.

In addition, in one embodiment, the signal processing unit 120 may select the uplink signal configuration on the basis of one or both of the number of radio resources and the transmission power allocated to the uplink shared channel. Namely, according to whether or not the number of resource blocks (RBs) allocated to the uplink shared channel (PUSCH or the like) is a predetermined threshold value or less, the user equipment 100 may selectively use the above-described uplink signal configuration. In addition, according to whether or not the transmission power required for simultaneously transmitting the uplink control channel (PUCCH) and the uplink shared channel (PUSCH) exceeds the maximum transmission power of the user equipment 100, the user equipment 100 may selectively use the above-described uplink signal configuration.

Specifically, in a case where the DFT-s-OFDM is selected as the communication scheme, when the number of radio resources allocated to the uplink shared channel is a predetermined threshold value or less, the signal processing unit 120 may generate the uplink control signal and the uplink data signal according to the uplink signal configuration of the first or fourth embodiment, and the transmission/reception unit 110 may simultaneously transmit the generated uplink control signal and the generated uplink data signal by the DFT-s-OFDM. On the other hand, when the number of radio resources allocated to the uplink shared channel is larger than the predetermined threshold value, the signal processing unit 120 may generate the uplink control signal and the uplink data signal according to the uplink signal configuration of the second or third embodiment, and the transmission/reception unit 110 may simultaneously transmit the generated uplink control signal and the generated uplink data signal by the DFT-s-OFDM.

In addition, in a case where the DFT-s-OFDM is selected as the communication scheme, when the transmission power required for simultaneous transmission of the uplink control signal and the uplink data signal is a maximum transmission power or less, the signal processing unit 120 may generate the uplink control signal and the uplink data signal according to the uplink signal configuration of the first or fourth embodiment, and the transmission/reception unit 110 may simultaneously transmit the generated uplink control signal and the generated uplink data signal by the DFT-s-OFDM. On the other hand, when the transmission power required for simultaneous transmission of the uplink control signal and the uplink data signal is higher than the maximum transmission power, the signal processing unit 120 may generate the uplink control signal and the uplink data signal according to the uplink signal configuration of the second or third embodiment, and the transmission/reception unit 110 may simultaneously transmit the generated uplink control signal and the generated uplink data signal by the DFT-s-OFDM.

On the other hand, in a case where the OFDM is selected as the communication scheme, when the number of radio resources allocated to the uplink shared channel is a predetermined threshold value or less, the signal processing unit 120 may generate the uplink control signal and the uplink data signal according to the uplink signal configuration of the first or fourth embodiment, and the transmission/reception unit 110 may simultaneously transmit the generated uplink control signal and the generated uplink data signal by the OFDM. On the other hand, when the number of radio resources allocated to the uplink shared channel is larger than the predetermined threshold value, the signal processing unit 120 may generate the uplink control signal and the uplink data signal according to the uplink signal configuration of the second or third embodiment, and the transmission/reception unit 110 may simultaneously transmit the generated uplink control signal and the generated uplink data signal by the OFDM.

Further, in a case where the OFDM is selected as the communication scheme, when the transmission power required for simultaneous transmission of the uplink control signal and the uplink data signal is a maximum transmission power or less, the signal processing unit 120 may generate the uplink control signal and the uplink data signal according to the uplink signal configuration of the first or fourth embodiment, and the transmission/reception unit 110 may simultaneously transmit the generated uplink control signal and the generated uplink data signal by the OFDM. On the other hand, when the transmission power required for simultaneous transmission of the uplink control signal and the uplink data signal is higher than the maximum transmission power, the signal processing unit 120 may generate the uplink control signal and the uplink data signal according to the uplink signal configuration of the second or third embodiment, and the transmission/reception unit 110 may simultaneously transmit the generated uplink control signal and the generated uplink data signal by the OFDM.

In addition, in one embodiment, the signal processing unit 120 may select the uplink signal configuration according to the applied rank. In particular, when the selected communication scheme is the OFDM, the signal processing unit 120 may select the uplink signal configuration according to the rank indicating the number of layers.

Specifically, in the case of Rank 1, the signal processing unit 120 may generate the uplink control signal and the uplink data signal according to the uplink signal configuration of the first embodiment, and the transmission/reception unit 110 may simultaneously transmit the generated uplink control signal and the generated uplink data signal by the OFDM. On the other hand, in the case of Rank 2 or more, the signal processing unit 120 may generate the uplink control signal and the uplink data signal according to the uplink signal configuration of the fourth embodiment, and the transmission/reception unit 110 may simultaneously transmit the generated uplink control signal and the generated uplink data signal by the OFDM.

In addition, in another embodiment, in a case where the rank is Rank 2 or more and, even if the uplink signal configuration of the fourth embodiment is applied, the transmission power required for simultaneous transmission of the uplink control signal and the uplink data signal is a maximum transmission power or less of the user equipment 100, the signal processing unit 120 may generate the uplink control signal and the uplink data signal according to the uplink signal configuration of the fourth embodiment, and the transmission/reception unit 110 may simultaneously transmit the generated uplink control signal and the generated uplink data signal by the OFDM. Alternatively, in a case where the rank is Rank 2 or more and the number of radio resources allocated to the uplink shared channel is a predetermined threshold value or less, the signal processing unit 120 may generate the uplink control signal and the uplink data signal according to the uplink signal configuration of the fourth embodiment, and the transmission/reception unit 110 may simultaneously transmit the generated uplink control signal and the generated uplink data signal by the OFDM. In addition, the determination criterion serving as the switching operation point of the embodiment may be set in the base station 200 (eNB) and the user equipment 100 (UE) in advance. In addition, the determination criterion of the embodiment may be notified from base station 200 (eNB) to the user equipment 100 (UE) by using broadcast information (MIB and/or SIB), a message (for example, RA response (also referred to as Message 2)) in a random access procedure, a message (for example, RRC connection setup or RRC connection reconfiguration) in a connection setup (radio resource control (RRC) connection setup or S1 connection setup) procedure, or the like.

In addition, the block diagrams used in the description of the above-described embodiment illustrate the blocks of functional units. These functional blocks (constituent units) are realized by arbitrary combination of hardware and/or software. In addition, means for implementing each functional block is not particularly limited. Namely, each functional block may be realized by one physically and/or logically combined device. Alternatively, two or more physically and/or logically separated devices may be directly and/or indirectly connected (for example, in a wired and/or wireless manner), and thus, each functional block may be realized by these plural devices.

Figure 7:
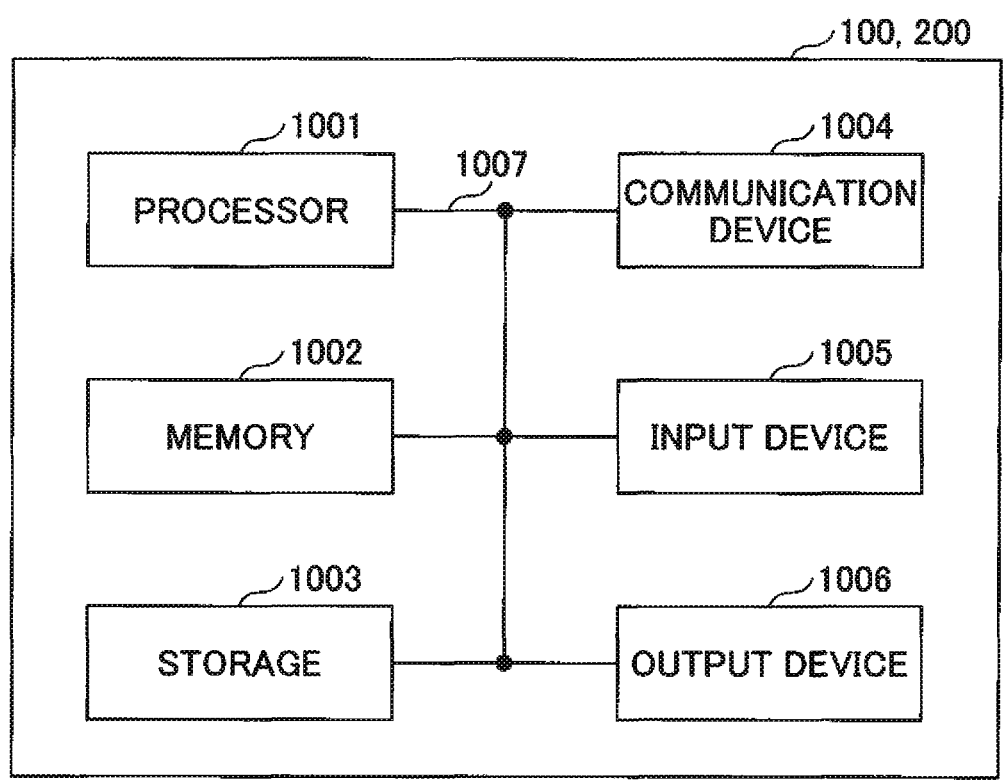
FIG. 7 is a block diagram illustrating a hardware configuration of a user equipment and a base station according to an embodiment of the present invention.

For example, the user equipment 100 and the base station 200 according to an embodiment of the present invention may function as a computer that performs processing of the wireless communication method according to the present invention. FIG. 7 is a block diagram illustrating a hardware configuration of the user equipment 100 and the base station 200 according to the embodiment of the present invention. The user equipment 100 and the base station 200 described above may be physically configured as a computer device including a processor 1001, a memory 1002, a storage 1003, a communication device 1004, an input device 1005, an output device 1006, a bus 1007, and the like.

In addition, in the following description, the term "device" can be replaced with a circuit, a device, a unit, or the like. The hardware configuration of the user equipment 100 and the base station 200 may be configured to include one or a plurality of the respective devices illustrated in the drawings or may be configured not to include some devices.

Each function of the user equipment 100 and the base station 200 is realized by allowing the processor 1001 to perform a calculation by allowing predetermined software (programs) to be loaded on the hardware such as the processor 1001 and the memory 1002 and controlling communication by the communication device 1004 and reading and/or writing of data in the memory 1002 and the storage 1003.

The processor 1001 operates, for example, the operating system to control the whole computer. The processor 1001 may be configured with a central processing unit (CPU) including an interface with a peripheral device, a control device, an arithmetic device, a register, and the like. For example, each component described above may be realized by the processor 1001.

In addition, the processor 1001 reads a program (program code), a software module, or data from the storage 1003 and/or the communication device 1004 to the memory 1002 and executes various types of processing according to the program and the like. As the program, a program that allows a computer to execute at least a portion of the operation described in the above embodiment is used. For example, the processing by each component of the user equipment 100 and the base station 200 may be realized by a control program that is stored in the memory 1002 and operates through the processor 1001, and other functional blocks may also be realized in the same manner. Although it has been described that the above-described various types of processing are executed by one processor 1001, the various types of processing may be executed simultaneously or sequentially by two or more processors 1001. The processor 1001 may be implemented with one or more chips. In addition, the program may be transmitted from the network via an electric communication line.

The memory 1002 is a computer-readable recording medium and is configured with, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (main memory), or the like. The memory 1002 can store executable programs (program codes), software modules, and the like for implementing the wireless communication method according to an embodiment of the present invention.

The storage 1003 is a computer-readable recording medium, and may be configured to include, for example, at least one of an optical disk such as a compact disc ROM (CD-ROM), a hard disk drive, a flexible disk, a magneto-optical disk (for example, a compact disk, a digital versatile disk, a Blu-ray (registered trademark) disk, or the like), a smart card, a flash memory (for example, a card, a stick, a key drive, or the like), a floppy (registered trademark) disk, a magnetic strip, and the like. The storage 1003 may be referred to as an auxiliary storage device. The above-described storage medium may be, for example, a database including the memory 1002 and/or the storage 1003, a server, or other appropriate medium.

The communication device 1004 is hardware (transmission/reception device) for performing communication between computers via a wired and/or wireless network and is also referred to as a network device, a network controller, a network card, a communication module, or the like. For example, each component described above may be realized by the communication device 1004.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. In addition, the input device 1005 and the output device 1006 may be configured to be integrated (for example, a touch panel).

In addition, the respective devices such as the processor 1001 and the memory 1002 are connected via a bus 1007 for communicating information. The bus 1007 may be configured as a single bus or may be configured as different buses between the devices.

In addition, the user equipment 100 and the base station 200 may be configured to include hardware such as a microprocessor, a digital signal processor (DSP), an application specific integrated circuit (ASIC), a programmable logic device (PLD), and a field programmable gate array (FPGA), and some or all of the functional blocks may be realized by the hardware. For example, the processor 1001 may be implemented with at least one of the above hardware.

Notification of information is not limited to the aspects/embodiments described in this specification, but the notification of information may be performed in other methods. For example, the notification of information may be performed by physical layer signaling (for example, downlink control information (DCI), uplink control information (UCI)), higher layer signaling (for example, radio resource control (RRC) signaling, medium access control (MAC) signaling, broadcast information (master information block (MIB), system information block (SIB)), other signals, or a combination thereof. In addition, the RRC signaling may be referred to as an RRC message, for example, an RRC connection setup message, an RRC connection reconfiguration message, or the like.

Each aspect/embodiment described in this specification can be applied to long term evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

In addition, processing procedures, sequences, flowcharts, and the like of each embodiment/modified example described in this specification may be exchanged as long as there is no inconsistency. For example, for the methods described in this specification, the elements of the various steps are presented in an exemplary order and are not limited to a specific order presented.

In this specification, in some cases, the specific operations performed by the base station 200 may be performed by upper nodes. It is apparent that, in a network configured with one or more network nodes having a base station, various operations performed for communication with a terminal may be performed by the base station and/or other network nodes other than the base station (for example, MME, S-GW, or the like is considered, but not limited thereto). In the above description, a case where there is one network node other than the base station, but a combination of a plurality of other network nodes (for example, MME and S-GW) may be used.

Information or the like can be output from an upper layer (or a lower layer) to a lower layer (or an upper layer). Information may be input/output through a plurality of network nodes.

Input/output information or the like may be stored in a specific site (for example, a memory) or may be managed in a management table. The input/output Information or the like may be overwritten, updated, or additionally written. The output information or the like may be deleted. The input information or the like may be transmitted to another device.

Determination may be performed by a value (0 or 1) represented by 1 bit, may be performed by a boolean value (true or false), or may be performed by comparison of numerical values (for example, comparison with a predetermined value).

Each aspect/embodiment described in this specification may be used alone, may be used in combination thereof, or may be used by being exchanged according to the execution. In addition, notification of predetermined information (for example, notification of "being X") is not limited to being performed explicitly, but the notification may be performed implicitly (for example, not notifying the predetermined information).

Heretofore, although the present invention has been described above in detail, it will be apparent to the skilled in the art that the present invention is not limited to the embodiments described herein. The present invention can be implemented as changes and modifications without departing from the spirit and scope of the present invention as defined by the scope of the claims. Accordingly, the description of this specification is provided for the purpose of illustration and description and does not have any restrictive meaning with respect to the present invention.

It should be noted that, whether or not to be referred to as software, firmware, middleware, microcode, hardware description language, or any other name, the software is widely interpreted so as to denote instructions, instruction sets, codes, code segments, program codes, programs, subprograms, software modules, applications, software applications, a software package, routines, subroutines, objects, executable files, execution threads, a procedure, a function, and the like.

In addition, the software and instructions, and the like may be transmitted and received via a transmission medium. For example, in a case where the software may be transmitted from a website, a server, or other remote resources by using wired techniques of a coaxial cable, a fiber optic cable, twisted pair, digital subscriber line (DSL) or the like and/or using wireless techniques of infrared, radio wave, microwave wave, and the like, these wired and/or wireless techniques are included within the definition of a transmission medium.

The information, signals, or the like described in this specification may be represented by using any of different technologies. For example, data, instructions, commands, information, signals, bits, symbols, chips, or the like mentioned over the above description may be represented by voltages, currents, electromagnetic waves, magnetic fields or particles, optical fields or photons, or any combination thereof.

In addition, the terms described in this specification and/or terms necessary for understanding this specification may be replaced by terms having the same or similar meanings. For example, the channel and/or the symbol may be signals. In addition, the signal may be a message. In addition, the component carrier (CC) may be referred to as a carrier frequency, a cell, or the like.

The terms "system" and "network" as used in this specification are used interchangeably.

In addition, the information, parameters, or the like described in this specification may be represented by an absolute value, may be expressed as a relative value from a predetermined value, or may be represented by another corresponding information. For example, the radio resource may be indicated by an index.

The names used for the above parameters are not limitative in any way. In addition, mathematical expressions and the like using these parameters may be different from those explicitly disclosed in this specification. Since the various channels (for example, PUCCH, PDCCH, or the like) and information elements (for example, TPC or the like) can be identified by any appropriate names, the names of such various channels and information elements are not limitative in any points.

A base station can accommodate one or more (for example, three) cells (also referred to as sectors). In a case where the base station accommodates a plurality of cells, the entire coverage area of the base station can be divided into a plurality of smaller areas. Each smaller area can be provided with communication services by a base station subsystem (for example, a small base station remote radio head (RRH) for indoors). The term "cell" or "sector" indicates a portion or all of the coverage area of a base station and/or a base station subsystem that performs communication services in this coverage. In addition, the terms "base station", "eNB", "cell", and "sector" may be used interchangeably in this specification. In some cases, the base station may also be referred to as a fixed station, a node B, an eNode B (eNB), an access point, a femto cell, a small cell, or the like.

In some cases, the mobile station may be referred to as a subscriber stations, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate term by the skilled in the art.

In some cases, the terms "determining" and "determining" used in this specification may include a wide variety of operations. The "determining" or the "deciding" may include something regarded as "determining" or "deciding"

of, for example, calculating, computing, processing, deriving, investigating, looking up (for example, looking up in a table, a database, or other data structures), or ascertaining. In addition, the "determining" or the "deciding" may include something regarded as "determining" or "deciding" of receiving (for example, receiving information), transmitting (for example, transmitting information), input, output, or accessing (for example, accessing data in memory). In addition, the "determining" or the "deciding" may include something regarded as "determining" or "deciding" of resolving, selecting, choosing, establishing, comparing, or the like. In other words, the "determining" or the "deciding" may include something regarded as "determining" or "deciding" of some operation.

The terms "connected", "coupled", or any variations thereof denotes any direct or indirect connection or coupling between two or more elements and may include one or more intermediate elements existing between two "connected" or "coupled" elements. The coupling or connection between the elements may be physical, logical, or a combination thereof. In a case where the terms are used in this specification, it may be considered that two elements are "connected" or "coupled" with each other by using one or more wires, cables and/or printed electrical connections and, as some non-limitative, non-exhaustive examples, by using electromagnetic energy such as electromagnetic energy having wavelengths of radio wave band, microwave band, and light band (including visible and invisible bands).

The reference signal may be abbreviated to an RS and may be referred to as a pilot in accordance with applied standards.

The phrase "on the basis of" used in this specification does not denote "on the basis of only" unless explicitly stated otherwise. In other words, the phrase "on the basis of" denotes both "on the basis of only" and "on the basis of at least".

Any reference to elements using notation such as "first", "second", or the like as used in this specification do not generally limit the amount or order of the elements. In this specification, the notation maybe used as a convenient method to distinguish two or more elements. Therefore, the reference to the first and second elements does not denote that only two elements can be used therein or that the first element needs to precede the second element in some form.

"Means" in the configuration of each of the above devices may be replaced with "unit", "circuit", "device", or the like.

As long as the terms "include, "include ding" and variations thereof are used in this specification or claims, these terms are intended to be inclusive similarly to the term "comprising". In addition, the term "or" used in this specification or claims is intended not to be an exclusive logic OR.

The radio frame may be configured to include one frame or a plurality of frames in the time domain. In the time domain, the one frame or each of the frames may be referred to as a subframe. The subframe may be further configured to include one slot or a plurality of slots in the time domain. The slot may be further configured to include one symbol or a plurality of symbols (OFDM symbol, SC-FDMA symbol, and the like) in the time domain. The radio frame, subframe, slot, and symbol represent time units for transmitting a signal. The radio frame, the subframe, the slot, and the symbol may be differently referred to. For example, in the LTE system, the base station performs scheduling for allocating radio resources (such as a frequency bandwidth or a transmission power that can be used in each mobile station) to each mobile station. The minimum time unit of scheduling may be referred to as a transmission time interval (TTI). For example, one subframe may be referred to as a TTI, or a plurality of consecutive subframes may be referred to as a TTI, or one slot may be referred to as a TTI. A resource block (RB) is a resource allocation unit in the time domain and the frequency domain, and the resource block may include one subcarrier or a plurality of consecutive subcarriers in the frequency domain. In addition, in the time domain of the resource block, the resource block may include one symbol or a plurality of symbols and may be one slot, one subframe, or one TTI in length. One TTI and one subframe each may be configured to include one resource block or a plurality of resource blocks. The above-described structure of the radio frame is merely an example, and the number of subframes included in the radio frame, the number of slots included in the subframe, the number of symbols and resource blocks included in the slot, and the number of subcarriers included in the resource block may be variously changed.

Heretofore, although the embodiments of the present invention have been described above in detail, the present invention is not limited to the specific embodiments described above, and various modifications and changes are possible within the scope of the invention disclosed in the claims.

The present application is based on and claims priority to Japanese patent application No. 2016-215704 filed on Nov. 2, 2016, the entire contents of which are hereby incorporated by reference.

EXPLANATIONS OF LETTERS OR NUMERALS

10 wireless communication system
100 user equipment
200 base station
110, 210 transmission/reception unit
120, 220 signal processing unit

The invention claimed is:

1. A user equipment capable of performing uplink transmission by a plurality of communication schemes, comprising:
 a transmission/reception unit configured to transmit and receive a radio signal to and from a base station; and
 a signal processing unit configured to process the radio signal,
 wherein the signal processing unit generates an uplink control signal and an uplink data signal according to a first uplink signal configuration mapping the uplink control signal to an uplink control channel and mapping the uplink data signal to an uplink shared channel,
 wherein the transmission/reception unit simultaneously transmits the uplink control signal and the uplink data signal generated by the first uplink signal configuration according to a selected communication scheme,
 wherein, in a case where DFT-s-OFDM is selected as the communication scheme, the signal processing unit generates the uplink control signal and the uplink data signal according to a third uplink signal configuration mapping the uplink control signal and the uplink data signal to the uplink shared channel by puncturing a portion of radio resources of the uplink shared channel and mapping the uplink control signal to the radio resource, and
 wherein the transmission/reception unit simultaneously transmits the uplink control signal and the uplink data signal generated by the third uplink signal configuration according to the DFT-s-OFDM.

2. The user equipment according to claim 1,
wherein the signal processing unit generates the uplink control signal and the uplink data signal according to a second uplink signal configuration mapping the uplink control signal to the uplink control channel of some layer and mapping the uplink data signal to the uplink control channel and the uplink shared channel of another layer, and
wherein the transmission/reception unit simultaneously transmits the uplink control signal and the uplink data signal generated by the second uplink signal configuration according to the selected communication scheme.

3. The user equipment according to claim 2, wherein the signal processing unit selects the uplink signal configuration according to a transmission timing of the uplink control signal and the uplink data signal.

4. The user equipment according to claim 2,
wherein, in a case where OFDM is selected as the communication scheme, the signal processing unit generates the uplink control signal and the uplink data signal according to the first uplink signal configuration, and
wherein the transmission/reception unit simultaneously transmits the uplink control signal and the uplink data signal generated by the first uplink signal configuration according to the OFDM.

5. The user equipment according to claim 2, wherein the signal processing unit selects the uplink signal configuration on the basis of one or both of the number of radio resources allocated to the uplink shared channel and a transmission power.

6. The user equipment according to claim 1, wherein the signal processing unit selects the uplink signal configuration according to a transmission timing of the uplink control signal and the uplink data signal.

7. The user equipment according to claim 6,
wherein, in a case where OFDM is selected as the communication scheme, the signal processing unit generates the uplink control signal and the uplink data signal according to the first uplink signal configuration, and
wherein the transmission/reception unit simultaneously transmits the uplink control signal and the uplink data signal generated by the first uplink signal configuration according to the OFDM.

8. The user equipment according to claim 6, wherein the signal processing unit selects the uplink signal configuration on the basis of one or both of the number of radio resources allocated to the uplink shared channel and a transmission power.

9. The user equipment according to claim 1,
wherein, in a case where OFDM is selected as the communication scheme, the signal processing unit generates the uplink control signal and the uplink data signal according to the first uplink signal configuration, and
wherein the transmission/reception unit simultaneously transmits the uplink control signal and the uplink data signal generated by the first uplink signal configuration according to the OFDM.

10. The user equipment according to claim 9, wherein the signal processing unit selects the uplink signal configuration on the basis of one or both of the number of radio resources allocated to the uplink shared channel and a transmission power.

11. The user equipment according to claim 1, wherein the signal processing unit selects the uplink signal configuration on the basis of one or both of the number of radio resources allocated to the uplink shared channel and a transmission power.

12. The user equipment according to claim 1,
wherein DFT-s-OFDM is selected as the communication scheme,
wherein, in a case where the transmission power required for simultaneous transmission of the uplink control signal and the uplink data signal is equal to or less than a maximum transmission power or in a case where the number of radio resources allocated to the uplink shared channel is equal to or less than a predetermined threshold value, the signal processing unit generates the uplink control signal and the uplink data signal according to the first uplink signal configuration,
wherein, in a case where the transmission power required for simultaneous transmission of the uplink control signal and the uplink data signal is higher than the maximum transmission power or in a case where the number of radio resources allocated to the uplink shared channel is greater than the predetermined threshold value, the signal processing unit generates the uplink control signal and the uplink data signal according to the third uplink signal configuration mapping the uplink control signal and the uplink data signal to the uplink shared channel by puncturing a portion of the radio resources of the uplink shared channel and mapping the uplink control signal to the radio resources, and
wherein the transmission/reception unit simultaneously transmits the uplink control signal and the uplink data signal generated according the first uplink signal configuration or the third uplink signal configuration according to the DFT-s-OFDM.

13. The user equipment according to claim 12, wherein, in the third uplink signal configuration, the signal processing unit maps the uplink control signal and the uplink data signal to the uplink shared channel by puncturing a portion of the radio resources of the uplink shared channel and performing rate-matching on the uplink data signal.

14. The user equipment according to claim 1,
wherein OFDM is selected as the communication scheme,
wherein, in a case where the transmission power required for simultaneous transmission of the uplink control signal and the uplink data signal is equal to or less than a maximum transmission power or in a case where the number of radio resources allocated to the uplink shared channel is equal to or less than a predetermined threshold value, the signal processing unit generates the uplink control signal and the uplink data signal according to the first uplink signal configuration,
wherein, in a case where the transmission power required for simultaneous transmission of the uplink control signal and the uplink data signal is higher than the maximum transmission power or in a case where the number of radio resources allocated to the uplink shared channel is greater than the predetermined threshold value, the signal processing unit generates the uplink control signal and the uplink data signal according to the third uplink signal configuration mapping the uplink control signal and the uplink data signal to the uplink shared channel by puncturing a portion of the radio resources of the uplink shared channel and mapping the uplink control signal to the radio resources, and wherein the transmission/reception unit simultaneously transmits the uplink control signal and the uplink data signal generated according the first uplink signal configuration or the third uplink signal configuration according to the OFDM.

15. The user equipment according to claim 1, wherein the signal processing unit selects the uplink signal configuration according to an applied rank.

* * * * *